(12) United States Patent
Jasleen et al.

(10) Patent No.: US 12,118,099 B2
(45) Date of Patent: Oct. 15, 2024

(54) AUTOMATED SECURITY PROFILES FOR AN INFORMATION HANDLING SYSTEM

(71) Applicant: Dell Products L.P., Round Rock, TX (US)

(72) Inventors: Fnu Jasleen, Austin, TX (US); Karun P. Reddy, Austin, TX (US)

(73) Assignee: Dell Products L.P, Round Rock, TX (US)

( * ) Notice: Subject to any disclaimer, the term of this patent is extended or adjusted under 35 U.S.C. 154(b) by 446 days.

(21) Appl. No.: 17/446,278

(22) Filed: Aug. 27, 2021

(65) Prior Publication Data

US 2023/0065840 A1    Mar. 2, 2023

(51) Int. Cl.
G06F 21/00 (2013.01)
G06F 21/32 (2013.01)
G06F 21/60 (2013.01)
G06N 20/00 (2019.01)

(52) U.S. Cl.
CPC ............ G06F 21/604 (2013.01); G06F 21/32 (2013.01); G06N 20/00 (2019.01)

(58) Field of Classification Search
None
See application file for complete search history.

(56) References Cited

U.S. PATENT DOCUMENTS

| 2016/0358014 | A1* | 12/2016 | Cohen | G09G 3/32 |
| 2019/0236342 | A1* | 8/2019 | Madden | G08B 13/19602 |
| 2020/0228491 | A1* | 7/2020 | Bleidorn | H04L 61/5014 |

* cited by examiner

*Primary Examiner* — Andrew J Steinle
(74) *Attorney, Agent, or Firm* — Norton Rose Fulbright US LLP (57) ABSTRACT

An information handling system (IHS) may receive, from a first sensor of the information handling system, first sensor data. The IHS may detect an individual other than a user of the IHS in a field of view of the first sensor based on the first sensor data. The IHS may then, in response to the first sensor detecting the individual, receive, from a second sensor of the IHS, second sensor data. Based, at least in part, on the first sensor data and the second sensor data, the IHS may determine relevance of the individual to an application displayed on a display of the IHS. The IHS may then generate an intent score for the individual based at least in part on the determined relevance. The IHS may then determine whether a security profile is to be applied to the IHS based, at least in part, on the intent score.

20 Claims, 4 Drawing Sheets

AUTOMATED SECURITY PROFILES FOR AN INFORMATION HANDLING SYSTEM

FIELD OF THE DISCLOSURE

The present disclosure generally relates to information handling systems, and more particularly relates to information handling system security.

BACKGROUND

As the value and use of information increase, individuals and businesses seek additional ways to process and store information. One option is an information handling system (IHS). An IHS generally processes, compiles, stores, and/or communicates information or data for business, personal, or other purposes. Non-limiting examples of IHSs include a personal computer (e.g., desktop or laptop), tablet computer, a two-in-one laptop/tablet computer, mobile device (e.g., personal digital assistant (PDA), smart phone, tablet computer, or smart watch). Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow them to be general or configured for a specific user or specific use such as financial transaction processing, reservations, enterprise data storage, or global communications.

As use of IHSs approaches ubiquity privacy is of increasing concern. For example, users may access and manipulate information using IHSs in a variety of settings, ranging from private to public. Some information may be sensitive, intended for exposure to only authorized users. Protecting information from being viewed by unauthorized users is of particular importance. For example, it may be desirable to prevent unauthorized individuals (e.g., onlookers, nonparticipating and/or unauthorized observers) from viewing information displayed on an IHS display when a user of the IHS is not present, over the shoulder of the user, or in other scenarios. Reliance on the user to maintain privacy of information displayed by an IHS can result in unintentional data privacy breaches, such as when a user is unaware that a threat to privacy of the information exists. For example, a user may be unaware of an individual viewing the information displayed on a display of the IHS and may therefore expose sensitive information to the spectating individual.

Shortcomings mentioned here are only representative and are included simply to highlight that a need exists for improved information handling systems. Implementations described herein address certain shortcomings but not necessarily each and every one described here or known in the art. Furthermore, implementations described herein may present other benefits than, and be used in other applications than, those of the shortcomings described above.

SUMMARY

Sensor data from one or more sensors coupled to an information handling system (IHS), such as sensed data may be used as one of the basis for application of a security profile to the IHS. The information associated with an application displayed on a display of the IHS may also be used as another one of the basis for application of a security profile to the IHS. As a non-limiting example, if one or more sensors (e.g., red, green, blue (RGB) sensor, camera, microphone, antenna, etc.) of an IHS detect the presence of an individual within the sensor's field of sensing, the IHS may determine the relevance of the individual to the application (e.g., a word document) displayed on the display of the IHS. The IHS may determine that the individual is collaborating with the user of the IHS on the application displayed on the display of the IHS, or the IHS may determine that the individual has no relevance to the application displayed on the display of the IHS. Based on the one or more sensor data and the foregoing relevance determination, the IHS may generate an onlooker intent score for the individual. In accordance with the onlooker intent score, the IHS may determine whether to activate a security profile (e.g., display a privacy screen on the display of the IHS) to prevent private and/or confidential information from being exposed.

In some implementations, the sensor data from the one or more sensors and the information associated with an application displayed on a display of the IHS may be provided to a machine learning algorithm as training data, and the machine learning algorithm may determine relevance of the individual to the application displayed on the display of the IHS. The machine learning algorithm, using the relevance data and other data, may generate an onlooker intent score. The onlooker intent score may then be used to determine whether a security profile is to be applied to the IHS. Furthermore, the machine learning algorithm may be continually updated using the one or more sensor data and the information associated with an application displayed on a display of the IHS to enhance functionality of the machine learning algorithm and a user experience. Thus, sensor data from the one or more sensors and information associated with an application displayed on a display of the IHS may be collected and analyzed as a basis for determining relevance of the individual and the generation of onlooker intent score, which may further be used for the application of a security profile (e.g., a privacy screen on the display of the IHS that hides the contents of the display) that is appropriate for the environment (e.g., with the presence of a spectating individual) in which the IHS is operated. Such automatic application of a security profile can enable an IHS to prevent exposure of sensitive information to unauthorized and/or spectating individuals while enhancing user experience.

A method for managing information handling system security may include receiving first sensor data from a first sensor and detecting an individual other than a user of the IHS in a field of view of the first sensor. The method further includes receiving second sensor data from a second sensor of the IHS, in response to the first sensor detecting the individual. For example, image data (e.g., two-dimensional image data) may be received from a first sensor of the one or more sensors, and in response to the first sensor detecting an individual other than a user of the IHS, additional image data (e.g., three-dimensional image data) may be received form a second sensor of the one or more sensors. The method further includes determining relevance of the individual to an application displayed on the display of the IHS based on one or more of the received first sensor data, the received second sensor data, the information associated with an application displayed on a display of the IHS. The IHS may then generate an onlooker intent score for the individual based, at least in part the determined relevance of the individual. The IHS may then make a determination, based at least in part on the onlooker intent score, with regards to whether a security profile is to be applied to the IHS.

In some implementations, additional sensor data, for example, audio data from one or more microphones, antenna data capturing information related to the peripheral systems (e.g., smartphone, laptop) associated with the individual may also be received. In such implementations, in addition to using the received first sensor data, the received second sensor data, and determining the relevance of the individual, the IHS may generate the onlooker intent score for the individual based, at least in part, on the foregoing additional sensor data. In some implementations, the IHS may train an unsupervised machine learning model using the received one or more sensor data, the additional sensor data, and the information associated with an application displayed on a display of the IHS to generate an onlooker intent score. In some implementations, using the onlooker intent score, the IHS may determine applying a security profile to the IHS. Based on the onlooker intent score, the IHS may make a determination to apply a security profile to the IHS. In some implementations, the application of a security profile may include one or more of: activating a privacy screen, minimizing one or more application windows (such as a Word document window, PDF window, web browser window, etc.) displayed on a display of the IHS, muting one or more speakers of the IHS, notifying a user of the IHS regarding the presence of a suspicious (or spectating/on-looking) individual. For example, an IHS may determine that an individual is present in the proximity of the IHS, that individual is looking at or is attempting to look at the application window displayed in the display of the IHS, and that the information displayed on the IHS is restricted or has no relevance to the individual. In response, the IHS may automatically hide one or more application windows displaying information on a display of the IHS. In other implementations, using the onlooker intent score, the IHS may determine that the individual is relevant to the application displayed on the display of the IHS and therefore recommend not applying a security profile (e.g., no privacy screen is needed to be applied) to the IHS.

In some implementations, the IHS may detect an individual, other than a user of the information handling system, using the first sensor data. For example, the first sensor data may be image data (e.g., two-dimensional image data) of a face of the individual, and the IHS may prompt the second sensor to gather second sensor data (e.g., three-dimensional image data) of, for example, the face of the individual. The IHS may then receive information associated with an application displayed on a display of the IHS. In some implementations, the foregoing received information may be employed, at least in part, to determine the relevance of the individual to the application displayed on the display of the IHS. For example, the information associated with the application may include collaboration information associated with the application; the collaboration information may include details regarding the individuals collaborating with the user of the IHS. In some implementations, these details may include a facial identification (ID) information (e.g., one or more facial features) associated with each of the collaborating individuals. In some implementations, the relevance of the of the individual to the application displayed on the display is determined by determining one or more facial features of the lurking individual based, at least in part, on the second sensor data and then comparing the one or more facial features of the lurking individual with facial ID information (e.g., one or more facial features) of the collaborating individuals. Based on this comparison, the IHS may determine that the lurking individual is in fact a collaborating individual. In that scenario, the IHS may determine that the onlooker intent score of the individual is below a predetermined threshold score and no security profile is to be applied to the IHS. In contrast, if it is determined, based on the comparison, that the lurking individual is in not a collaborating individual, the IHS may determine that the onlooker intent score of the individual is above a predetermined threshold score and a security profile is to be applied to the IHS. In some implementations, in addition to the image data received using first and second sensors of the one or more sensors, additional sensor data, for example, audio data from one or more microphones, antenna data capturing information related to the peripheral systems (e.g., smartphone, laptop) associated with the individual may also be received. This additional sensor data may further improve the accuracy of the onlooker intent score.

An IHS may include a memory, one or more sensors (e.g., a first sensor, a second sensor, a third sensor, and a fourth sensor) and a processor for performing the steps described herein. Alternatively or additionally, a computer program product may include a non-transitory computer-readable medium comprising instructions to cause a controller to perform the steps described herein.

The foregoing has outlined rather broadly certain features and technical advantages of implementations of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Implementations incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and implementations of the teachings. This focus is provided to assist in describing the teachings and should not be interpreted as a limitation on the scope or applicability of the teachings. However, other teachings can certainly be used in this application. The teachings can also be used in other applications and with several different types of architectures.

For purposes of this disclosure, an information handling system (IHS) or a peripheral system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more virtual or physical buses operable to transmit communications between the various hardware and/or software components.

A security profile management system executed by an IHS may aggregate environmental data surrounding the IHS. The environmental data may be received from one or more sensors. The security profile management system may receive data with regards to the application (e.g., application window such as a Microsoft® PowerPoint® file) displayed on the display of the IHS. The security profile management system may determine the relevance of a spectating (onlooking or lurking) individual to the application displayed on the display of the IHS based at least in part on the environmental data and some information relating the application displayed on the display of the IHS. The security profile management system may generate an onlooker intent score based at least in part on the determined relevance of the spectating individual. The security profile management system may determine whether to apply a security profile for application to the IHS based, at least in part, on the onlooker intent score. In some implementations, the security profile management system may determine applying a security profile to the IHS based at least in part on the onlooker intent score. In other implementations, the security profile management system may determine that applying a security profile to the IHS is not necessary based at least in part on the onlooker intent score. The application of the security profile may be performed automatically by the IHS based in part on the onlooker intent score, environmental data received via the one or more sensors, and determining the relevance of the spectating individual using the information displayed on the display of the IHS.

Figure 1:
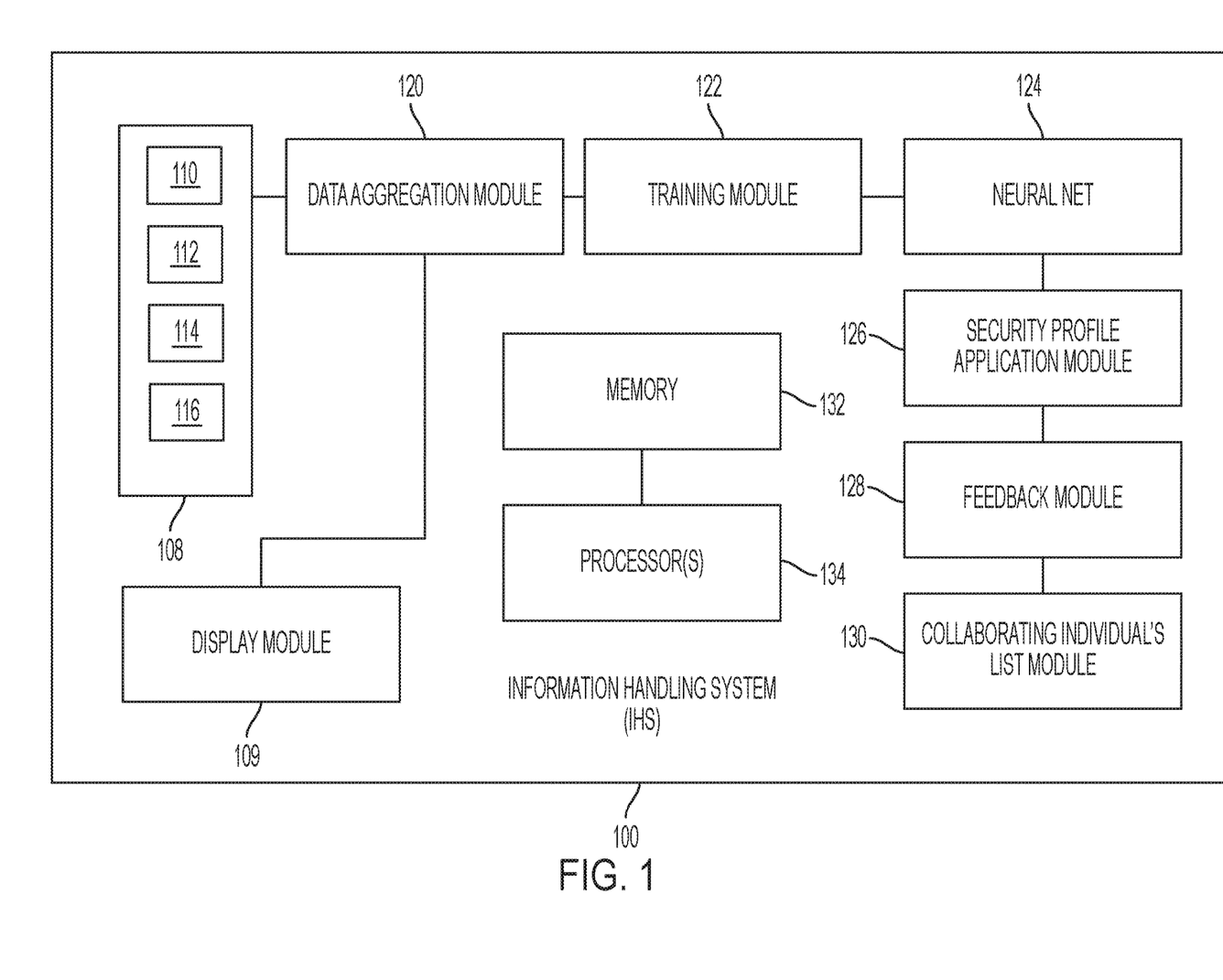
FIG. 1 is a diagram of an example information handling system including a system for automated security profile application, according to some implementations of the disclosure.

Referring to FIG. 1, a diagram of an example IHS 100 including a system for automated security profile application is shown. IHS 100 may include one or more sensors 108, display module 109, image processing module 113, data aggregation module 120, a training model 122, neural net 124, and security profile application module 126. IHS 100 may further include memory 132 and one or more processors 135. The one or more sensors 108 of IHS 100 may sense one or more characteristics of the environment in which IHS 100 is being operated. For example, in an environment, such as an office conference room or a coffee shop, IHS 100 may be at risk of encountering individuals who may view or may attempt to view information displayed on the display of IHS 100 without the consent of the user. In such environments, a user of IHS 100 may be at risk of having private and/or confidential information from being exposed, particularly when the individuals have no relevance to the information displayed on display. Accordingly, environmental data may be collected from the one or more sensors 108 to detect individuals other than the user of IHS 100, and the relevance of the individuals to the information displayed on display of IHS 100 may be determined. IHS 100 may then generate an intent score of the detected individuals based on the determined relevance. IHS 100 may then determine whether a security profile needs to be applied to IHS 100, based at least in part of the intent score.

The one or more sensors 108 may, for example, include a red, blue, green (RBG) sensor 110. The RGB sensor 110 may be camera that is configured to capture and/or collect image data (within a field of view of the sensor) of the environment in which the IHS 110 is being operated. In some implementations, the RGB sensor 110 may capture two-dimensional images of the environment. The IHS 100 may use image processing software (e.g., image processing module 113 including the image processing software), such as person detection software, to detect the presence of one or more individuals in images captured by the RGB sensor 110. In some implementations, the RGB sensor 110 may be configured to capture one or more images of an environment at a regular interval (e.g., every 30 seconds). Accordingly, the captured one or more images may be processed by the image processing software at regular intervals. In some implementations, the intervals at which images are captured by the RGB sensor 110 and the intervals at which those images are processed may be the same; however, in other implementations, the intervals may be different. In some implementations, these intervals may be defined by the user of the IHS 100.

The one or more sensors 108 may also include a camera 112 for collecting video and/or image data. The camera 112 may, for example, be used in response to the RGB sensor 110 detecting the presence one or more individuals in the environment in which IHS 100 is being operated. The camera 112 may consume more power than the RGB sensor 110, and therefore may be employed to capture second sensor data after the RGB sensor 110 has detected the presence of one or more individuals. In this regard, the IHS 100 is configured to implement a system that consumes low power relative to a system that solely relies on sensors such as camera 112 in detecting the presence of the one or more individuals. In some implementations, the camera 112 may be used to capture images of the environment in which the one or more detected individuals are detected. The images captured by the camera 112 may be higher in quality (e.g., more number of pixels) as compared to the images captured by the RGB sensor 110. IHS 100 may use image recognition software in image processing module 113, such as facial recognition software, to extract and/or capture one or more facial features of the one or more individuals in images or video captured by the camera 112. IHS 100, using the image processing software in image processing module 113, may identify one or more individuals, at least based in part, on the extracted one or more facial features of the one or more individuals. IHS 100, using the image processing software in image processing module 113, may also extract other features, such as head pose, lip motion, facial expressions, etc., of the one or more individuals. In some implementations, the IHS 100, using the image processing software in image processing module 113, may also extract proximity details of the one or more individuals. For example, the image processing module 113 may extract proximity data, such as a distance between the user of the IHS 100 and the one or more individuals. The proximity data generated by the image processing module may be used by the security profile module 126 of the IHS 100 to determine whether the one or more individuals are in a position where they may view private information displayed by a display of the IHS 100. In some implementations, the first and second sensor data (and/or data, such as facial features, derived therefrom) captured by the respective sensors may be used, at least in part, by a training model 122 of the IHS 100 in determining the relevance of the one or more lurking individuals.

The one or more sensors 108 may also include a BLUETOOTH (Short Range Wireless) antenna 114. The BLUETOOTH (Short Range Wireless) antenna 114 may sense BLUETOOTH (Short Range Wireless) signals from BLUETOOTH (Short Range Wireless) enabled devices within a certain proximity of the IHS 100. Such signals may, for example, indicate that one or more individuals with one or more external information handling systems (such as smartphones, laptops, etc.) are within a predetermined proximity of the IHS 100. In some implementations, data sensed by the BLUETOOTH (Short Range Wireless) antenna 114 may be used to monitor a distance between the IHS 100 and the one or more external information handling systems. The BLUETOOTH (Short Range Wireless) data from the BLUETOOTH (Short Range Wireless) sensor 114 may, for example, include one or more device identifiers for BLUETOOTH (Short Range Wireless) devices in proximity with the IHS 100, such as MAC addresses of the BLUETOOTH (Short Range Wireless) devices. The one or more sensors 108 may also include other antennas, such as WIFI (WLAN) antennas or BLUETOOTH (Short Range Wireless) Low Energy (BLE) antennas. In some implementations, the data from the antenna may also be used, at least in part, by a training model 122 of the IHS 100 in determining the relevance of the one or more lurking individuals.

The one or more sensors 108 may also include a microphone 116 for capturing audio data. For example, the microphone 114 may capture sounds generated by the one or more individuals present in the environment. Example sounds include footsteps or other sounds associated with the one or more individuals. Alternatively or additionally, the microphone 116 may capture voice data of individuals. In some implementations, IHS 100 may identify one or more individuals in proximity to IHS 100 based on voice data captured by the microphone 114. In some implementations, the data from the microphone may also be used, at least in part, by a training model 122 of the IHS 100 in determining the relevance of the one or more lurking individuals.

The display module 109 may be communicatively coupled to the display of the IHS 100. The display (not shown in FIG. 1) may include a graphical user interface (GUI). In some implementations, the GUI may be configured and generated by the display module 109. The display module 109 may be configured to identify information associated with an application (e.g., Microsoft® PowerPoint® file) displayed on a display of the IHS 100. The information identified by the display module 109 may include one or more of restriction information associated with the application, collaboration information associated with the application. In some implementations, the restriction information may provide details as to whether the file is exclusive to the user of the IHS 100, or whether the file is shared, or whether the file has some permissions information related to the content of the file associated with it. In some implementations, the permissions information may include details with regards to whether individuals other than the user of the IHS 100 have permissions to view, modify, read, write, etc. the file. The permissions information may also include details regarding the individuals other than the user of the IHS 100 have permissions to view, modify, read, write, etc. the file. In some implementations, the details regarding the individuals may be included as part of the restriction information or may be independently available (e.g., as collaboration information) as part of the information associated with the application identified by the display module 109. In either case, the details regarding the individuals may include their names, facial identification features, voice data, peripheral devices' MAC addresses, and the like. In some implementations, the details regarding the individuals may be provided to a collaborating individual list module 130, which maintains a list of trusted individuals and associated information, such as devices associated with collaborating individuals, speech samples and other speech data related to the trusted individuals, image data, such as face scans, associated with the collaborating individuals, and other data related to the collaborating individuals. The information identified by the display module 109 may be used by the training model 122 of the IHS 100 to determine the relevance of the one or more lurking individuals to the information associated with the application displayed on the display of the IHS 100. In addition to the data captured by the one or more sensors, the information identified by the display module 109 may further be used by the training model 122 of the IHS 100 to determine the relevance of the one or more lurking individuals to the application displayed on a display of the IHS 100.

For example, environmental data from the one or more sensors 108 and the information identified by the display module 109 may be received by a data aggregation module 120. The environmental data received from the one or more sensors 108 and/or the information identified by the display module 109 may be used, for example, as training data to train a machine learning algorithm for the determining the relevance of the one or more lurking individuals to the information associated with the application displayed on the display of the IHS 100. In some implementations, the machine learning algorithm may also be trained using the above-mentioned data in generating an intent score for the one or more lurking individuals. The training model 122 may, for example, be an unsupervised machine learning model.

In some implementations, the data aggregated by the data aggregation module 120, the relevance determined by the training model 122, and the generated onlooker intent score may also be provided to a neural net 124 for determining whether a security profile is to be applied to the IHS 100 based, at least in part, on the onlooker intent score. For example, data received from the one or more sensors 108 and other data (e.g., the information identified by the display module 109) collected by the data aggregation module 120 may be used to train the neural net 124 and/or may be used by the neural net 124 in determining whether a security profile is needed to be applied. Based on an analysis of data collected by the data aggregation module 120 and other data, the neural net 124 may recommend the security profile application module 126 to apply a security profile. In some implementations, the neural net 124 may recommend application of the security profile based on the onlooker intent score generated by the neural net 124 being either below or above a threshold score. For example, the neural net may determine that no security profile is to be applied to the IHS, based at least in part, on the onlooker intent score being above a predefined threshold intent score, or the neural net may determine that a security profile is to be applied to the IHS, based at least in part, on the onlooker intent score being below a predefined threshold intent score. In some implementations, the predefined threshold intent score may also be determined by the neural net based, at least on the environmental data captured using one or more sensors 108.

In operation, if a data from the RGB sensor 110 indicates that an individual is in its field of vision (e.g., is near or approaching), the camera 112 may then be activated to capture one or more images or videos of the individual. In some implementations, the data captured by the RGB sensor 110, the data captured by the camera 112, and the information regarding the application displayed on the display of the IHS 100 may be employed by the training model 122 and/or the neural net 124 to determine the relevance of the individual to the application displayed on the display of the IHS 100. In some implementations, in addition to the data captured by the RBG sensor 110, the camera 112, and the information regarding the application displayed on the display of the IHS 100, data captured by other one or more sensors 108, such as audio data, antenna data, etc., may also be provided to the training model 122 and/or the neural net 124 to determine the relevance of the individual to the application displayed on the display of the IHS 100 and to generate the onlooker intent score. Based on the relevance determination, the IHS using the neural net 124 may generate an onlooker intent score for the individual. If, based on the onlooker intent score, the neural net 124 recommends that the individual is unauthorized and should not view the sensitive information on the display of the IHS 100, the neural net 124 may recommend and/or instruct the security profile application module 126 to apply a security profile that includes activating a privacy screen on the display of the IHS 100. Additionally or alternatively, the neural net 124 may recommend and/or instruct the security profile application module 126 to silence one or more speakers of the IHS 100 (e.g., in case the application displayed on the IHS 100 includes a video conference call). In some implementations, the security profile application module 126 may also provide the data aggregation module 120 with information specifying the security profile that was applied to aid in training the neural net 124 and the machine learning model 122.

In some implementations, other data may also be collected. The other collected data may include a user response to the application of the security profile may be provided as a feedback to the data aggregation module 120. For example, the neural net 124 may generate an onlooker intent score that recommends to the security profile application module 126 to apply a security profile, indicating that the individual in close proximity to the IHS 100 is unauthorized to view the display of the IHS 100. For example, the neural net 124 may determine that an unauthorized individual is behind the user in a position or close to a position where the individual may be able to view sensitive information on a display of the IHS 100. After the application of the security profile, the feedback module 128 may notify the user of the IHS 100 about the intent score generated by the neural net 124 and request the user's feedback to the intent score and the applied security profile. In some implementations, the feedback module 128 may also specify the data (e.g., one or more sensor data) that was used to generate the intent score. The feedback module 128 may then record a user response to the notification. For example, if the user agrees with the application of the privacy screen in response to the generated onlooker intent score, the feedback module 128 may inform the data aggregation module 120 of the user's response to the notification. If the user disagrees with the application of the privacy screen in in response to the generated onlooker intent score, the feedback module 128 may inform the data aggregation module 120 of the user's response to the notification. The data aggregation module 120 may then provide the recorded response to the model 122 and/or the neural net 124 for training the model 122 and/or the neural net 124. As another example, the neural net 124, following the application of the privacy screen, may instruct the feedback module 128 to notify the user about the generated intent score and an unrecognized device (e.g., detected via one or more sensors 108, such as the BLUETOOTH (Short Range Wireless) antenna 114 or another sensor) based on which the intent score was generated. For example, BLUETOOTH (Short Range Wireless) antenna 114 may sense a device identifier such as a BLUETOOTH (Short Range Wireless) ID or a MAC address of a device. The neural net 124 may determine that the device is not a known device and, after applying a security profile, may instruct the feedback module 128 to notify the user that the privacy screen was implemented because of the presence of a lurking individual and their unknown device and request feedback. If the user recognizes the device and can attest that the owner of the device is one of the collaborating individual (e.g., individual who is associated with the application displayed on the display of the IHS 100), the user may input a response to the feedback module 128 associating the device with a known contact, such as a collaborating contact. The user's input may then be used by the machine learning algorithm in training the model and/or the neural net.

The feedback module 128 may provide the user input to a collaborating individual's list module 130. The collaborating individual's list module 130 may, for example, maintain a list of trusted individuals and associated information, such as devices associated with collaborating individuals, image data (e.g., facial feature data), speech samples and other speech data related to the trusted individuals, image data, such as face scans, associated with the collaborating individuals, and other data related to the collaborating individuals. The collaborating individual's list module 130 may update a profile for the collaborating individual based on the user input received by the feedback module 128. The collaborating individual's list module 130 may also provide collaborating individual's list data to the data aggregation module 120 for use in training the model 122 and/or the neural net 124. The neural net 124 may also use the collaborating individual's list data from the collaborating individual's list module 130 in determining a security profile to apply. For example, if the neural net 124 determines that an individual detected based on the data from sensors 108 is a collaborating individual, the neural net 124 may instruct application of a more lenient security profile, such as a security profile with few or no security measures. Thus, a security profile management system of an information handling system 100 may train a neural net for security profile selection using sensed data and user responses and may automatically apply security profiles to an information handling system based on sensed data.

Figure 2:
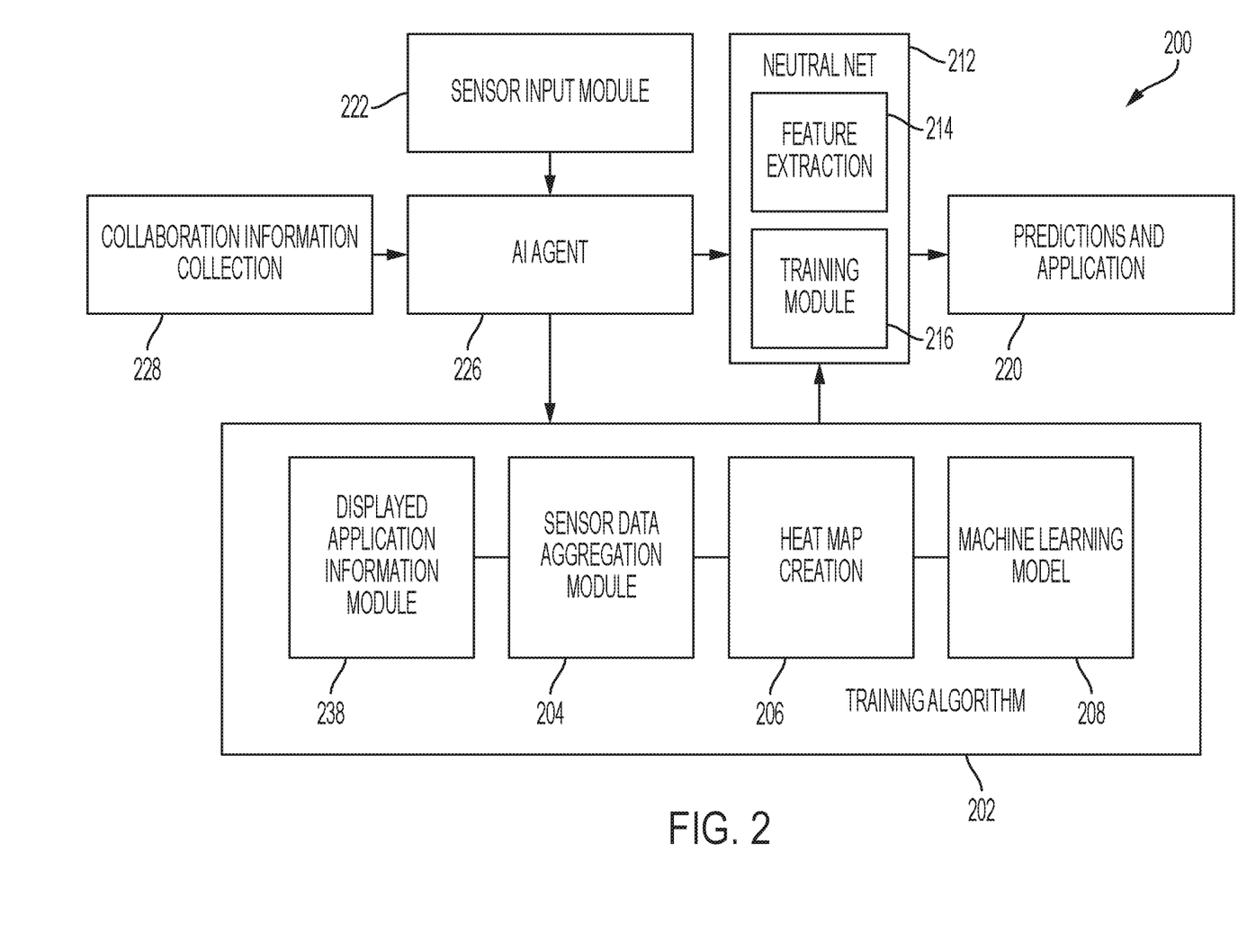
FIG. 2 is a block diagram of data processing of an example system for automated information handling system security profile management according to some implementations of the disclosure.

Referring now to FIG. 2, a block diagram of data processing of an example system for automated security profile management system 200 according to some implementations of the disclosure is shown. The security profile management system 200 may be executed by one or more processors of the IHS 100 for generating an onlooker intent score based on sensed environmental conditions and data with regards to the application (e.g., application window such as a Microsoft® PowerPoint® file) displayed on the display of the IHS 100. The security profile management system 200 may also be executed by one or more processors of the IHS 100 for automatically determining whether a security profile is to be applied to the IHS 100 based on the onlooker intent score. The security profile management system 200 may include one or more applications run in the foreground or background of the IHS 100.

A training algorithm 202 of the system 200 may assemble training data to be used in training a neural net 212 for generation of onlooker intent score and recommendation/selection of appropriate security profile. The training algorithm 200 may include a sensor data aggregation module 204 for aggregating sensor data from one or more sensors (e.g., one or more sensors 108) of the IHS 100. For example, the sensor data aggregation module 204 may aggregate sensed data from one or more RGB sensors of the IHS 100, one or more cameras of the IHS 100, one or more microphones of IHS 100, one or more antennas of the IHS 100, such as BLUETOOTH (Short Range Wireless), WIFI (WLAN), cellular, or other antennas, and data from other IHS 100 sensors.

In order to facilitate the determination of relevance of one or more individuals to an application (e.g., application window such as a document file) displayed on the display of the IHS 100, the training algorithm 202 may also include displayed application information module 238, which collects and stores data with regard to restriction and/or collaboration information associated with the application displayed on the display of the IHS 100. The displayed application information module 238 may also collect and store information with regards to the one or more collaborating individuals associated with the application displayed on the display of the IHS 100. The information with regards to the one or more collaborating individuals associated with the application displayed on the display of the IHS 100 may include names, speech samples, face scans, and other data related to the collaborating individuals, such as MAC addresses of the peripheral devices (e.g., smartphones, laptops) associated with the one or more collaborating individuals. As a non-limiting example, the displayed application information module 238 may include details regarding whether the application displayed on the display of the IHS 100 is exclusive to the user of the IHS 100, has some restrictions associated with it, or has one or more collaborating individuals associated with the application. As another non-limiting example, the displayed application information module 238 may include one or more collaborating individual profiles including data associated with collaborating individuals, such as image data of faces of the collaborating individuals, device identifiers associated with the collaborating individuals, voice data associated with the collaborating individuals, and other data associated with the collaborating individuals. In some implementations, the module 238 may provide data regarding the collaborating individuals to the sensor data aggregation module 204 to determine if any collaborating individuals may be detected based on the sensed data. The training algorithm 202 may also receive responses from the user of the IHS 100 to prompts regarding applied security profile and sensed data, such as prompts asking the user, before or after the application of a privacy screen, if a privacy screen should be displayed when this particular individual is detected.

The sensor data from the sensor data aggregation module 204, the information regarding the application displayed on the display of the IHS from the displayed application information module 234, and, in some instances, the user's feedback may be used by heat map creation module 206 to create a heat map of predictors. For example, the heat map creation module 206 may determine which sensed data most likely corresponds to scenarios in which privacy might be at risk, such as presence of unidentified individuals, presence of the user in a public environment such as a coffee shop or conference room, presence of a user at the user's workstation or office, whether one or more individuals is viewing the information (or the application) on a display of the information handling system from near the user. The heat map created by the heat map creation module 206 may, for example, be a matrix of values used to train a neural net executed by neural net module 212. The matrix may, for example, be a two-by-two matrix including a data source, such as a source sensor, and a value received from the sensor. The heat map may include an initial set of weights and values to be applied to sensor data but may update such weights based on user response data and training data.

A machine learning model module 208, which in some implementations may be an unsupervised machine learning model, may receive the heat map from the heat map creation module 206, sensor data from the sensor data aggregation module 204, data from the displayed application information module 238, and other data. Using the received data, the machine learning model 208 may determine the relevance of the one or more lurking individuals to the application displayed on the display of the IHS 100. The machine learning model module 208 may also generate an intent score based on the heat map, the sensor data, data from the displayed application information module 238, the determined relevance, and other data. For example, the machine learning model 208 may determine clusters of the heat map, such as certain sets of sensor data or other data, for which onlooker intent score should be generated for the information handling system. For example, a certain onlooker intent score may be generated for sensor data that indicates that the IHS 100 is being surrounded by one or more individuals who have no relevance to the information displayed on the display of the IHS 100, while a different onlooker intent score may be generated for sensor data sets that indicate that the IHS 100 is being used around individuals who are relevant to the information displayed on the display of the IHS 100. The machine learning model module 208 may, for example, also determine which security measures could be included based on the intent score. For example, the learning model, based on the intent score, may determine security profiles should include one or more of minimizing one or more windows displaying information on a display of an information handling system, activating a privacy screen, muting one or more speakers of the information handling system, and/or other security measures. In some implementations, the machine learning model module 208 may be evaluated using one or more techniques. For example, the machine learning model module 208 may be evaluated using adjusted r square technique, root mean square error (RMSE)

technique, and mean absolute error (MAE) technique. In some implementations, the learning model module 208 may be hosted in the cloud.

The training algorithm 202 may provide data, such as data regarding the relevance of the one or more individuals determined by the machine learning model module 208, the onlooker intent score generated by the machine learning module 208, heat map data generated by the heat map creation module 206, sensor data aggregated by the sensor data aggregation module 204, and data from the displayed application information module 238 to a neural net executed by the neural net module 212. A feature extraction module 214 of the neural net module 212 may extract features from the sensor data and/or data from the displayed application information module 238. A convolutional neural net training model module 216 may train the neural net using the extracted features, sensor data and/or data from the displayed application information module 238. The neural net training module 216 may train the neural net to automatically determine whether a security profile needs to the applied to the IHS 100 in light of the given set of sensed sensor data characteristics, data from the displayed application information module 238, and/or extracted data. Thus, when sensed data from a plurality of sensors and data from the displayed application information module 238 is fed into the neural net 212, the neural net 212 may determine whether a security profile needs to be applied to the IHS 100. The neural net 212 may provide the security profile recommendation to a prediction and application module 220, which may automatically apply the recommended security profile to the IHS 100. Thus, the neural net 212 may be trained, based on sensor data, data from the displayed application information module 238, collaborating individual's list data, user feedback response data, and other data, to automatically recommend a security profile for the IHS 100.

The artificial intelligence (AI) agent 226 may control and/or monitor a collaboration information collection module 228. The collaboration information collection module 228 may, for example, monitor for sensor data indicating presence of an individual that is collaborating with the user of the IHS 100. For example, the collaboration information collection module 228 may monitor for image, video, audio, and/or wireless signal data that indicates presence of a collaborating individual. For example, image or video data that includes images of a face of an individual that match image data stored in the displayed application information module 238 and associated with an individual collaborating the user of the IHS 100 may indicate that the collaborating individual is present. Likewise, audio data received from audio sensors that matches voice data associated with an individual on the displayed application information module 238 may indicate that the individual is present. Wireless signal data received by antennas of the information handling system, such as BLUETOOTH (Short Range Wireless) or WIFI (WLAN) device identifiers, that match wireless signal data associated with an individual on the displayed application information module 238 may indicate that the individual is present. In some implementations, the collaboration information collection module 228 may monitor for additional devices that may be associated with individuals on the collaborating contacts list. For example, the collaboration information collection module 228 may detect, based on image data or wireless device identifier data, that an individual on the displayed application information module 238 is present. The collaboration information collection module 228 may also determine, based on sensed antenna or image data, that an unrecognized wireless device is also present. The collaboration information collection module 228 may monitor the individual and the unrecognized device to determine if the unrecognized device should be associated with the collaborating individual on the module 238. For example, the collaboration information collection module 228 may monitor a position of the individual and a position of the unrecognized device to determine if the unrecognized device moves when the individual moves. If the collaboration information collection module 228 determines that the device is associated with the individual on the module 238, the collaboration information collection module 228 may update the module 238 to include identification information for the unrecognized device, such as a device identifier for the device. Thus, if the device is detected in the future, the neural net 212 may determine that the collaborating individual is present based on the previously unrecognized device. Thus, a collaborating individual's list and/or the module 238 may be automatically updated based on devices or other information determined to be associated with a collaborating individual.

The AI agent 226 may aggregate sensor data received from sensors at a sensor input module 222 and collaboration information collection 228. In some implementations, the AI agent may receive sensor data from the sensor input module 222 and may prompt the user of the IHS 100 for a response based on the sensor data. For example, if the sensor data, such as image and audio data, indicates that a user is in a public environment and that an individual other than the user is standing in a position where the individual could see sensitive information displayed on the display of the information handlings system, the system 200 may first apply a security profile (e.g., privacy screen) and then may notify the user of the potential breach of security. In some implementations, the AI agent 226 may prompt the user with a selection of potential responses, such as confirming if the lurking individual is not collaborating individual and if the applied security profile to maintain privacy was correctly implemented. In some implementations, the AI agent 226 may monitor a user response to the notification. The AI agent 226, executed by the information handling system, may then collect the user response data and/or sensor data from the sensor input module 222 and data regarding information displayed on the display and may provide the collected data to the neural net 212, such as to a training module 216 of the neural net 212 for training the neural net 212.

Figure 3:
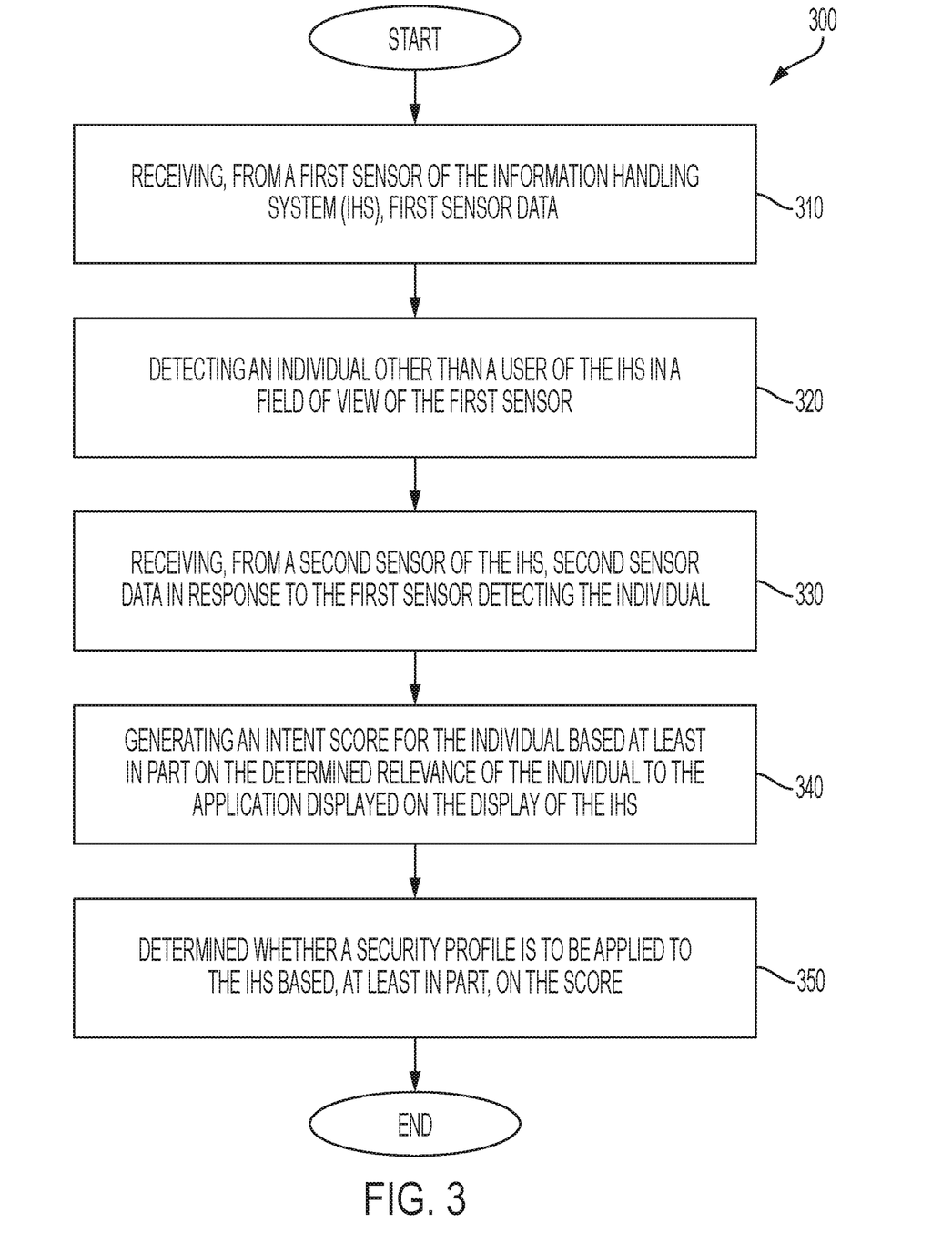
FIG. 3 is a block diagram of an example method for determining whether a security profile is needed to be applied based on intent score, according to some implementations of the disclosure.

Referring to FIG. 3, a block diagram of an example method for determining whether a security profile is needed to be applied based on intent score according to some implementations of the disclosure is shown. An information handling system (e.g., IHS 100) may execute a machine learning algorithm including a neural net to determine whether a security profile is needed to be applied to an IHS based on intent score. In determining whether a security profile needs to be applied, the information handling system may determine that no security profile is needed to be applied, or the information handling system may determine that a security profile is needed to be applied.

The method 300 may begin, at step 310, with receipt of first sensor data from a first sensor. The first sensor may include a low-power RGB sensor, which may be configured to capture image data, such as two-dimensional images. The first sensor data may be provided to an image processing software (e.g., facial recognition software) or the neural net to detect an individual other than the user of the IHS 100 in a field of view if the first sensor. The method 300 may then include, at step 320, detection of an individual other than a user of the IHS 100 in field of view of the first sensor. For example, the IHS 100 may use image processing software, such as facial detection software, to detect the presence of one or more individuals in the images captured by the RGB sensor 110. The method 300 may include step 330 which includes receiving from a second sensor of the IHS 100 a second sensor data in response to the first sensor detecting the individual. The first sensor may be considered low-powered with respect to the second sensor, which may consume more power than the first sensor. The second sensor may include a camera which captures additional images (or videos in some implementations) of the detected individual. The second sensor data may also be provided to the image processing software (e.g., facial recognition software) or the neural net to extract, for example, one or more facial features of the detected individual. Employing first sensor to detect the presence and the second sensor to determine facial features of the detected individual helps with keeping the overall power consumption of the visual sensors (e.g., RGB sensor and camera) low.

The method 300 may proceed to step 340 which may include generating an intent score for the individual. In some implementations, generating the intent score includes determining relevance of the individual to an application displayed on a display of the IHS 100. In some implementations, determining the relevance of the individual to the application displayed on a display of the IHS 100 may be based at least on the received first sensor data and the received second sensor data. In some implementations, the determining the relevance of the individual to the application displayed on the display may include receiving information associated with the application displayed on a display of the IHS. The information associated with the application may include restriction information associated with the application, collaboration information associated with the application, etc. In some implementations, the restriction information may provide details as to whether the file is exclusive to the user of the IHS 100, or whether the file is shared, or whether the file has some permissions information (e.g., permissions to view, modify, read, write, etc.) related to the content of the file associated with it. The information associated with the application may also include details (e.g., one or more facial features) regarding the individuals (e.g., collaborating individuals) other than the user of the IHS 100 have permissions to view, modify, read, write, etc. the file. In some implementations, the received first sensor data, the received second sensor data, and the information associated with the application (e.g., restriction/collaboration information) may be provided to the machine learning model and/or the neural net to determine the relevance of the individual to the application displayed on a display of the IHS 100.

In some implementations, determining the relevance of the individual to the application displayed on the display comprises verifying an identity of the individual using the second sensor data. For example, based, at least in part, on the second sensor data, one or more facial features of the individual may be determined. The one or more facial features of the individual may be compared with the one or more facial features of the collaborating individuals. These comparisons may be performed by the machine learning model and/or the neural net. Based on this comparison, the IHS may determine that the individual is either in fact a collaborating individual or a lurking individual who does not have any relevance to the information displayed on the display of the IHS.

In some implementations, generating the intent score may be based at least in part on the first sensor data, second sensor data, and/or the determined relevance of the individual to the application displayed on the display of the IHS. For example, the neural net, based on one or more of the first sensor data, the second sensor data, the information associated with the application displayed on the display of the IHS, and/or the determined relevance information, may generate an onlooker intent score for the individual. The onlooker intent score may further facilitate determining, in step 360 of the method 300, whether a security profile is to be applied to the IHS. In some implementations, this determination may be performed by the IHS in that the IHS may determine that the onlooker intent score of the individual is below a predetermined threshold score and no security profile is to be applied to the IHS. In contrast, if it is determined, based on the comparison, that the lurking individual is in not a collaborating individual, the IHS may determine that the onlooker intent score of the individual is above a predetermined threshold score and a security profile is to be applied to the IHS. In some implementations, in addition to the image data received using first and second sensors of the one or more sensors, additional sensor data, for example, audio data from one or more microphones, antenna data capturing information related to the peripheral systems (e.g., smartphone, laptop) associated with the individual may also be received. This additional sensor data may further improve the accuracy of determining the relevance of the individual to the application displayed on the display of the IHS and therefore further improve the accuracy of the generated onlooker intent score.

In summary, the information handling system may, based on determined relevance, automatically apply a security profile to the information handling system. For example, the one or more sensors data may be received by a neural net for intent score generation and security profile recommendation and/or selection. The neural net may determine that a security profile is to be applied to the information handling system and may apply the security profile to the information handling system automatically. For example, the neural net may determine that based on the one or more sensors data the information handling system is at risk of exposing private information to individuals who have no relevance to the application that is displayed on the display of the information handling system, and therefore may apply a security profile to the information handling system. For example, if the detected individual is not determined to be relevant to the application displayed on the display of the information handling system, the information handling system may activate a security profile that includes alerting the user and/or turning on a privacy screen. A security profile may include one or more of activating a privacy screen, minimizing one or more windows displayed on the display of the information handling system, muting a speaker of the information handling system, or blocking connection of the information handling system associated with the first sensor data. Activating a privacy screen may include adjusting a display output of the information handling system to obscure private information displayed on the display of the information handling system from individuals other than the user.

Figure 4:
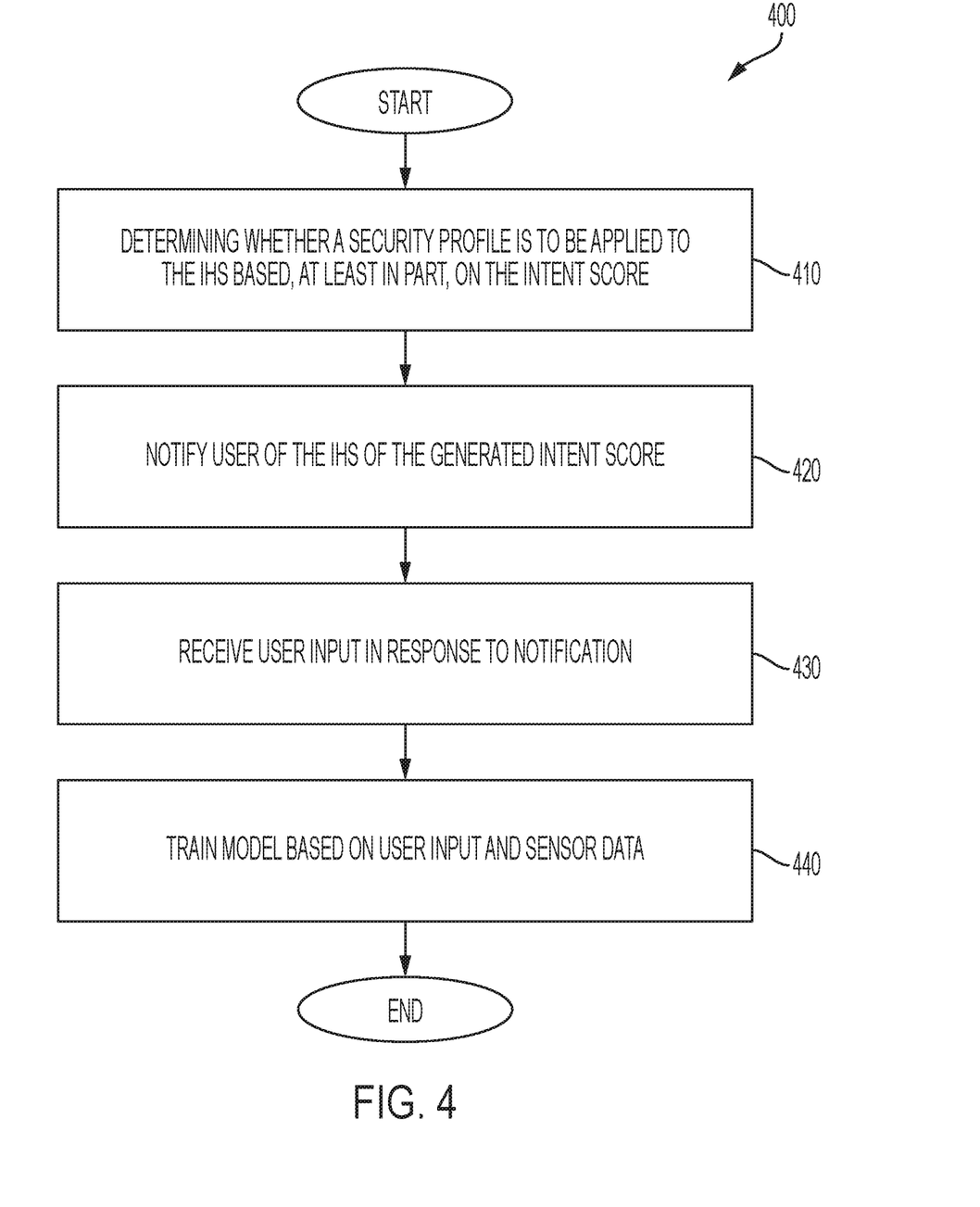
FIG. 4 a block diagram of an example method for training a machine learning algorithm for security profile application according to some implementations of the disclosure.

An information handling system may use received sensed environmental data and user responses to received sensed environmental data to train a machine learning model including a neural net for selection of information handling system security profiles. An example method 400 for training a machine learning model for selection of information handling system security profiles is shown in FIG. 4. The method 400 may begin at step 410 which corresponds to step 360 of the method 300. Accordingly, the determining in step 410 is performed similar to the determining described with respect to step 360 discussed above.

The step 410 may include determining whether a security profile is to be applied to the IHS based, at least in part, on the intent score. It may be determined by the neural net based on the intent score that a privacy screen is needed to be applied to the HIS. At step 410, a user may be notified of the generated intent score and/or the application of the security profile. For example, the neural net (e.g., neural net 124) may determine that an unauthorized individual is behind the user in a position or close to a position where the individual may be able to view sensitive information on a display of the IHS 100. After the application of the security profile, a feedback may be provided to the user. For example, the feedback module 128 may notify the user (e.g., the feedback module 128 may display a pop-up notifier) of the IHS 100 about the intent score generated by the neural net 124; the notification to the user may include details regarding the one or more sensor data that was used to determine the intent score. The notification may request the user's feedback to the intent score, the applied security profile, and the data that was employed to generate the intent score.

At step 430, the information handling system may receive user input in response to the notification. For example, if the user agrees with the application of the privacy screen in response to the generated onlooker intent score, the user's response is recorded. As an example, feedback module 128 may inform the data aggregation module 120 of the user's response to the notification. In some implementations, the user may not agree with the application of the privacy screen in response to the generated onlooker intent score. For example, the information handling system may notify the user that a privacy screen was applied based on the intent score generated using one or more sensors, such as the BLUETOOTH (Short Range Wireless) antenna or another sensor. For example, BLUETOOTH (Short Range Wireless) antenna may sense a device identifier such as a BLUETOOTH (Short Range Wireless) ID or a MAC address of a device. The information handling system may determine that the device is not a known device and, after applying a security profile, may instruct the information handling system to notify the user that an unknown device was detected and request feedback. If the user recognizes the device and can attest that the owner of the device is one of the collaborating individuals (e.g., individual who is associated with the application displayed on the display of the IHS 100), the user may input a response to the information handling system associating the device with a known contact, such as a trusted contact.

At step 440, the information handling system may also train a model based on the user response input. Training the machine learning model may, for example, include at least one of training a machine learning model, such as an unsupervised machine learning model, for generation of information handling system security profiles or training a neural net for selection of a profile for application to an information handling system. For example, the information handling system may use the user input and received sensor data to train a machine learning algorithm for generation of an intent score and implementation of a security profiles. The information handling system may generate an intent score for a lurking individual after determining the relevance of the lurking individual to the application displayed on the display of the information handling system. The information handling system may determine the relevance using an unsupervised machine learning model as discussed herein, such as through generation of a heatmap of sensed data characteristics. Generation of the intent score and application of a security profile may be based on the one or more sensor data, information related to the application displayed on the display, and determined relevance. The information handling system may, alternatively or additionally, use user input to train a neural network for security profile selection. For example, in some implementations, the information handling system may train a neural net at step 440 without receipt of user input, such as using sensor data and other data without user input received in response to the sensor data, while in other implementations the information handling system may use both received sensor data, other data, and the received user response data.

The flow chart diagrams of FIGS. 3 and 4 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Machine learning models, as described herein, may include logistic regression techniques, linear discriminant analysis, linear regression analysis, artificial neural networks, machine learning classifier algorithms, or classification/regression trees in some implementations. In various other implementations, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received sensor data, and a system or environmental characteristic and/or a degree to which such an influencing attribute affects the outcome of such a system or environmental characteristic.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding implementations described herein may be utilized. Accordingly, the appended claims are intended to include within their scope such processes, machines, manufacture, compositions of matter, means, methods, or steps.

What is claimed is:

1. A method for managing information handling system (IHS) security, comprising:
   receiving, from a first sensor of the IHS, first sensor data;
   detecting, based on the first sensor data, an individual other than a user of the IHS in a field of view of the first sensor;
   receiving, from a second sensor of the IHS, second sensor data;
   generating an intent score for the individual based at least in part on the first sensor data and the second sensor data,
   wherein generating the intent score for the individual comprises determining a relevance of the individual to information displayed on the IHS, wherein determining the relevance comprises comparing a MAC address of a one or more peripheral devices of the individual to a collaborating individual list and comparing a determined distance between the IHS and one or more peripheral devices of the individual to a predefined threshold distance, and
   determining whether a security profile is to be applied to the IHS based, at least in part, on the intent score being above a predefined threshold intent score.

2. The method of claim 1, wherein determining the relevance of the individual to the application displayed on the display comprises:
   receiving information associated with the application displayed on the display of the IHS, wherein the information associated with the application comprises one or more of:
      restriction information associated with the application, or
      collaboration information associated with the application;
   verifying an identity of the individual using, at least in part, the second sensor data.

3. The method of claim 2 further comprising: training a machine learning model for generation of intent score for the individual based, at least in part, on the received first sensor data, the received second sensor data, and the received information associated with the application displayed on the display of the IHS.

4. The method of claim 2, wherein verifying the identity of the individual comprises:
   determining one or more facial features of the individual based, at least in part, on the second sensor data;
   comparing the one or more facial features of the individual with one or more facial features of the one or more collaborating individuals.

5. The method of claim 1, wherein in determining whether the security profile is to be applied to the IHS, determining that one of:
   a security profile is to be applied to the IHS based, at least in part, on the intent score being above a predefined threshold intent score, or no security profile is to be applied to the IHS, based at least in part, on the intent score being below a predefined threshold intent score.

6. The method of claim 1 further comprising:
   receiving, from a third sensor of the IHS, third sensor data;
   receiving, from a fourth sensor of the IHS, fourth sensor data, wherein generating the intent score for the IHS comprises generating the intent score based, at least in part, on the received third sensor data and the received fourth sensor data.

7. The method of claim 6, wherein the first sensor comprises a red, blue, green (RBG) sensor, the second sensor comprises a microphone, the third sensor comprises one or more microphones, and fourth sensor comprises an antenna, and
   wherein the first sensor data comprises one or more two-dimensional images associated with the individual, the second sensor data comprises one or more three-dimensional images associated with the individual, the third sensor data comprises audio data associated with the individual, the fourth sensor data comprises data identifying a peripheral system associated with the individual.

8. An information handling system (IHS) security, comprising:
   one or more processors;
   a memory; and
   one or more sensors;
   wherein the one or more processors are configured to perform steps comprising:
      receiving, from a first sensor of the one or more sensors, first sensor data;
      detecting, based on the first sensor data, an individual other than a user of the IHS in a field of view of the first sensor;
      receiving, from a second sensor of the one or more sensors, second sensor data in response to the first sensor detecting the individual;
      generating an intent score for the individual based at least in part on the first sensor data and the second sensor data;
      wherein generating the intent score for the individual comprises determining a relevance of the individual to information displayed on the IHS, wherein determining the relevance comprises comparing a MAC address of a one or more peripheral devices of the individual to a collaborating individual list and comparing a determined distance between the IHS and one or more peripheral devices of the individual to a predefined threshold distance, and determining whether a security profile is to be applied to the IHS based, at least in part, on the intent score being above a predefined threshold intent score.

9. The IHS of claim 8, wherein the one or more processors performing the steps of determining the relevance of the individual to the application displayed on the display further perform steps comprising:

receiving information associated with the application displayed on the display of the IHS, wherein the information associated with the application comprises one or more of:
restriction information associated with the application, or
collaboration information associated with the application;
verifying an identity of the individual using, at least in part, the second sensor data.

10. The IHS of claim 9, wherein the one or more processors performing the steps of verifying the identity of the individual further perform steps comprising:

determining one or more facial features of the individual based, at least in part, on the second sensor data;
comparing the one or more facial features of the individual with one or more facial features of the one or more collaborating individuals.

11. The IHS of claim 8, wherein the one or more processors in determining whether the security profile is to be applied to the IHS determine one of:

a security profile is to be applied to the IHS based, at least in part, on the intent score being above a predefined threshold intent score, or
no security profile is to be applied to the IHS, based at least in part, on the intent score being below a predefined threshold intent score.

12. The IHS of claim 8, wherein the one or more processors are further configured to perform the steps comprising:

receiving, from a third sensor of the IHS, third sensor data;
receiving, from a fourth sensor of the IHS, fourth sensor data, wherein generating the intent score for the IHS comprises generating the intent score based, at least in part, on the received third sensor data and the received fourth sensor data.

13. The IHS of claim 12, wherein the first sensor comprises a red, blue, green (RBG) sensor, the second sensor comprises a microphone, the third sensor comprises one or more microphones, and fourth sensor comprises an antenna, and wherein the first sensor data comprises one or more two-dimensional images associated with the individual, the second sensor data comprises one or more three-dimensional images associated with the individual, the third sensor data comprises audio data associated with the individual, the fourth sensor data comprises data identifying a peripheral system associated with the individual.

14. The IHS of claim 12 wherein the one or more processors are further configured to perform the steps comprising: training a machine learning model for generation of intent score for the individual based, at least in part, on the received first sensor data, the received second sensor data, the received third sensor data, the received fourth sensor data, and a received information associated with the application displayed on the display of the IHS.

15. A non-transitory computer readable medium comprising instructions for causing an information handling system (IHS) to perform steps comprising:

receiving, from a first sensor of the IHS, first sensor data;
detecting, based on the first sensor data, an individual other than a user of the IHS in a field of view of the first sensor;
receiving, from a second sensor of the IHS, second sensor data in response to the first sensor detecting the individual;
generating an intent score for the individual based at least in part on the first sensor data, and the second sensor data;
wherein generating the intent score for the individual comprises determining a relevance of the individual to information displayed on the IHS, wherein determining the relevance comprises comparing a MAC address of a one or more peripheral devices of the individual to a collaborating individual list and comparing a determined distance between the IHS and one or more peripheral devices of the individual to a predefined threshold distance, and
determining whether a security profile is to be applied to the IHS based, at least in part, on the intent score being above a predefined threshold intent score.

16. The non-transitory computer readable medium of claim 15, wherein the instructions for causing the IHS to perform the step of determining the relevance of the individual further includes steps comprising:

determining the relevance of the individual to the application displayed on the display further includes instructions for causing the IHS to perform the steps comprising:
receiving information associated with the application displayed on the display of the IHS, wherein the information associated with the application comprises one or more of:
restriction information associated with the application, or
collaboration information associated with the application;
verifying an identity of the individual using, at least in part, the second sensor data.

17. The non-transitory computer readable medium of claim 15, wherein the instructions for causing the IHS to determine whether the security profile is to be applied to the IHS includes instructions for causing the IHS to perform one of:

determine that a security profile is to be applied to the IHS based, at least in part, on the intent score being above a predefined threshold intent score, or
determine that no security profile is to be applied to the IHS, based at least in part, on the intent score being below a predefined threshold intent score.

18. The non-transitory computer readable medium of claim 15 further comprising instructions for causing the IHS to perform steps comprising:

receiving, from a third sensor of the IHS, third sensor data;
receiving, from a fourth sensor of the IHS, fourth sensor data, wherein generating the intent score for the IHS comprises generating the intent score based, at least in part, on the received third sensor data and the received fourth sensor data.

19. The non-transitory computer readable medium of claim 15, wherein the first sensor comprises a red, blue, green (RBG) sensor, the second sensor comprises a microphone, the third sensor comprises one or more microphones, and fourth sensor comprises an antenna, and wherein the first sensor data comprises one or more two-dimensional images associated with the individual, the second sensor data comprises one or more three-dimensional images associated with the individual, the third sensor data comprises audio data associated with the individual, the fourth sensor data comprises data identifying a peripheral system associated with the individual.

20. The non-transitory computer readable medium of claim 15 further comprising instructions for causing the IHS to perform steps comprising: training a machine learning model for generation of intent score for the individual based, at least in part, on the received first sensor data, the received second sensor data, the received third sensor data, the received fourth sensor data, and a received information associated with the application displayed on the display of the IHS.

* * * * *